United States Patent
Tan (10) Patent No.: US 10,911,258 B2
(45) Date of Patent: Feb. 2, 2021

(54) SOCIAL COLLABORATION METHOD FOR ALL THINGS BASED ON A FRIEND GROUP GENERATED BY USING A SERVICE AGENT GENERATOR

(71) Applicant: Gemtek Technology Co., Ltd., Hsinchu (TW)

(72) Inventor: Der-Hwa Tan, Hsinchu (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 116 days.

(21) Appl. No.: 15/791,381

(22) Filed: Oct. 23, 2017

(65) Prior Publication Data
US 2019/0007231 A1 Jan. 3, 2019

(30) Foreign Application Priority Data
Jun. 30, 2017 (TW) ............................. 106121907 A (51) Int. Cl.
| | | |
|---|---|---|
| H04L 12/28 | (2006.01) | |
| G06Q 50/00 | (2012.01) | |
| H04L 12/58 | (2006.01) | |

(52) U.S. Cl.
CPC ......... *H04L 12/2829* (2013.01); *G06Q 50/01* (2013.01); *H04L 12/282* (2013.01); *H04L 51/02* (2013.01); *H04L 51/043* (2013.01); *H04L 51/046* (2013.01); *H04L 51/32* (2013.01)

(58) Field of Classification Search
CPC ... H04L 12/00; H04L 12/282; H04L 12/2803; H04L 12/2827; H04L 12/2829; H04L 51/046; H04L 51/32; H04M 11/00; G06F 3/048; G06Q 50/01

USPC .................................................. 715/706, 714
See application file for complete search history.

(56) References Cited

U.S. PATENT DOCUMENTS

| | | | | |
|---|---|---|---|---|
| 9,207,832 | B1* | 12/2015 | Khouri | G06Q 10/10 |
| 2003/0233424 | A1* | 12/2003 | Seo | G08C 17/02 |
| | | | | 709/217 |
| 2007/0286181 | A1* | 12/2007 | Bushmitch | H04L 12/2825 |
| | | | | 370/356 |
| 2013/0290234 | A1* | 10/2013 | Harris | G06N 5/022 |
| | | | | 706/46 |
| 2014/0317502 | A1* | 10/2014 | Brown | G06F 9/453 |
| | | | | 715/706 |

(Continued)

FOREIGN PATENT DOCUMENTS

| | | |
|---|---|---|
| CN | 1756172 A | 4/2006 |
| CN | 104009908 A | 8/2014 |

(Continued)

*Primary Examiner* — Reza Nabi
*Assistant Examiner* — Hwei-Min Lu
(74) *Attorney, Agent, or Firm* — Winston Hsu (57) ABSTRACT

A social collaboration method for all things includes inputting a message, generating a plurality of keywords according to the message, selecting at least one friend of a social platform for generating a message friend group according to the plurality of keywords, setting a function status of each friend of the message friend group according to the plurality of keywords, generating a virtual configuration friend corresponding to a message rule according to the function status of the each friend and the plurality of keywords, and generating a response message corresponding to the message rule by the virtual configuration friend.

12 Claims, 6 Drawing Sheets

(56) References Cited

U.S. PATENT DOCUMENTS

| | | | |
|---|---|---|---|
| 2015/0286388 A1* | 10/2015 | Jeon | G06F 3/04847 715/736 |
| 2016/0019402 A1* | 1/2016 | Khandelwal | G06F 21/6254 726/26 |
| 2016/0127145 A1* | 5/2016 | Fu | H04L 12/2816 700/275 |
| 2016/0127174 A1* | 5/2016 | Fu | H04L 67/125 709/220 |
| 2017/0295114 A1* | 10/2017 | Goldberg | G06N 20/00 |
| 2018/0300399 A1* | 10/2018 | Blandin | H04L 51/046 |

FOREIGN PATENT DOCUMENTS

| | | | |
|---|---|---|---|
| CN | 105978790 A | 9/2016 | |
| CN | 106713113 A | 5/2017 | |
| TW | I503784 B | 10/2015 | |
| WO | 2014/038790 A1 | 3/2014 | |
| WO | WO-2017026888 A1 * | 2/2017 | H04L 51/02 |
| WO | WO-2017030433 A1 * | 2/2017 | H04L 51/046 |
| WO | WO-2017086772 A1 * | 5/2017 | H04L 12/6418 |

\* cited by examiner

SOCIAL COLLABORATION METHOD FOR ALL THINGS BASED ON A FRIEND GROUP GENERATED BY USING A SERVICE AGENT GENERATOR

BACKGROUND OF THE INVENTION

1. Field of the Invention

The present invention illustrates a social collaboration method, and more particularly, a social collaboration method for all things based on a friend Group generated by using a service agent generator corresponding to a smart configuration rule.

2. Description of the Prior Art

Internet of things is a popular network technique in recent years. Internet of things can digitize resources in the world and transmit digital data to anywhere through a network. Internet of things can integrate distributed resources and unifies digital data between different things. For example, some entity objects such as a smart lock, a smart refrigerator, a smart home system can be integrated by using internet of things. Further, internet of things can be configured by using a remote controller or a predetermined time schedule. A user can track and measure specific resources by using internet of things for avoiding waste, loss, and consumption of the resources. For consumables, messages can be sent to the user for replacing items, maintaining items, or recalling items by using internet of things.

In general, internet of things uses one-to-one communication mode, such as a people-to-machine (P2M) mode or a machine-to-machine (M2M) mode. For example, the user can use a smart phone for controlling an air conditioner. However, operations of internet of things are generally applied to the P2M mode or the M2M mode. Internet of things lacks of functions for integrating related people and machines to proceed with social collaboration. In other words, when the user requires some services or certain information, internet of things cannot automatically integrate or find optimal configurations of essential resources in the world. Thus, so far, internet of things cannot generate a systematic response for integrating essential resources with respect to specific services or specific information requested by the user.

SUMMARY OF THE INVENTION

In an embodiment of the present invention, a social collaboration method for all things is disclosed. The social collaboration method for all things comprises inputting a message, generating a plurality of keywords according to the message, selecting at least one friend of a social platform for generating a message friend group according to the plurality of keywords, setting a function status of each friend of the message friend group according to the plurality of keywords, generating a virtual configuration friend corresponding to a message rule according to the function status of each friend and the plurality of keywords, and generating a response message corresponding to the message rule by the virtual configuration friend.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
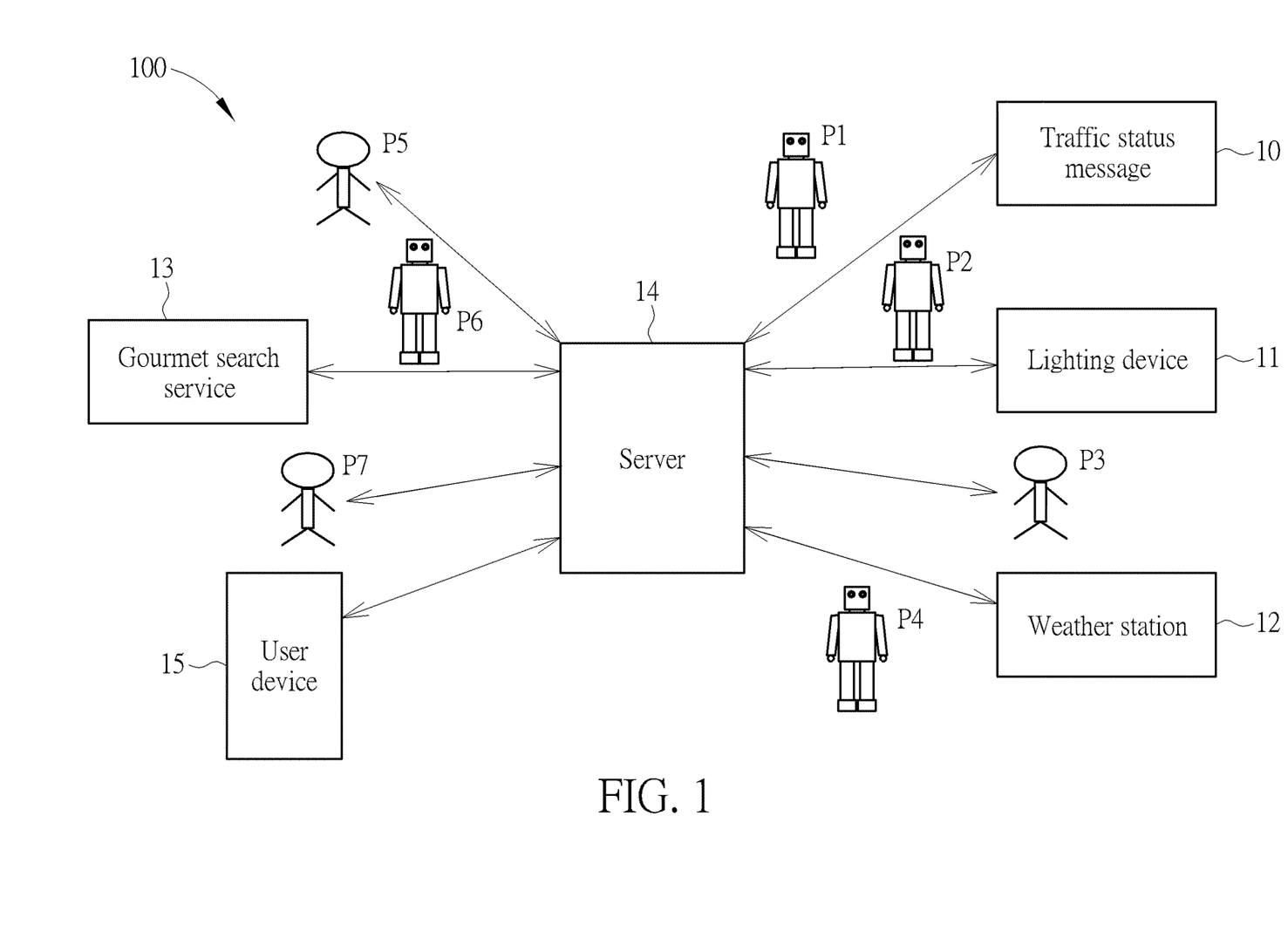
FIG. 1 is a structure of a social collaboration system for all things according to the embodiment of the present invention.

FIG. 1 is a structure of a social collaboration system 100 for all things according to the embodiment of the present invention. The social collaboration system 100 includes a server 14 and a user device 15. The server 14 can be a cloud server capable of performing various functions driven by its software program. In the social collaboration system 100, the server 14 has a software program for providing a social platform. The software program can be used for driving a service agent generator or executing functions of agent services. The server 14 uses the service agent generator for dynamically intervening between information and services or between people and things. Further, the server 14 can recommend appropriate service configurations to a user. The server 14 can block malicious information or services. The server 14 can establish network connections. Thus, the server 14 can acquire a plurality of resources by using a wired network or a wireless network. For example, the server 14 can acquire a traffic status message 10. The server 14 can be linked to a lighting device 11 and a weather station 12. Also, the server 14 can provide a gourmet search service 13 through the network. In other words, the server 14 of the social collaboration system 100 can provide various configurations of services, messages, devices, or resources. In the social collaboration system 100, the server 14 can generate a corresponding virtual person according to provided resources. For example, the server 14 uses the network to retrieve the traffic status message 10. Thus, the server 14 can generate a virtual person P1 corresponding to the traffic status message 10. The server 14 is linked to the lighting device 11. Thus, the server 14 can generate a virtual person P2 corresponding to the lighting device 11. The server 14 is linked to the weather station 12. Thus, the server 14 can generate a virtual person P4 corresponding to the weather station 12. The server 14 provides a gourmet search service 13 by using the network. Thus, the server 14 can generate a virtual person P6 corresponding to the gourmet search service 13. The virtual persons P1, P2, P4 and P6 have functions of artificial intelligence and deep learning. They can automatically gather information, perform collaboration interaction, make friends, and automatically organize groups through the network. Further, the social platform of the server 14 can include a plurality of real persons. Each real person can correspond to a nickname of a real user. In FIG. 1, the real persons are denoted as P3, P5, and P7 in the social platform of the server 14. In other words, the social platform of the server 14 includes a plurality of identities. A part of identities can be real persons. Another part of identities can be virtual persons. Also, the server 14 can be linked to the user device 15 through the network. The user can operate the social platform of the server 14 through the user device 15 for acquiring various services, information, or configurations. As previously mentioned, the social platform of the server 14 includes the plurality of real persons and the plurality of virtual persons. Thus, the user can select a virtual person as a contact person for communicating information by using the user device 15. By doing so, the user can acquire some relevant resources from response messages generated by the selected virtual person.

Figure 2:
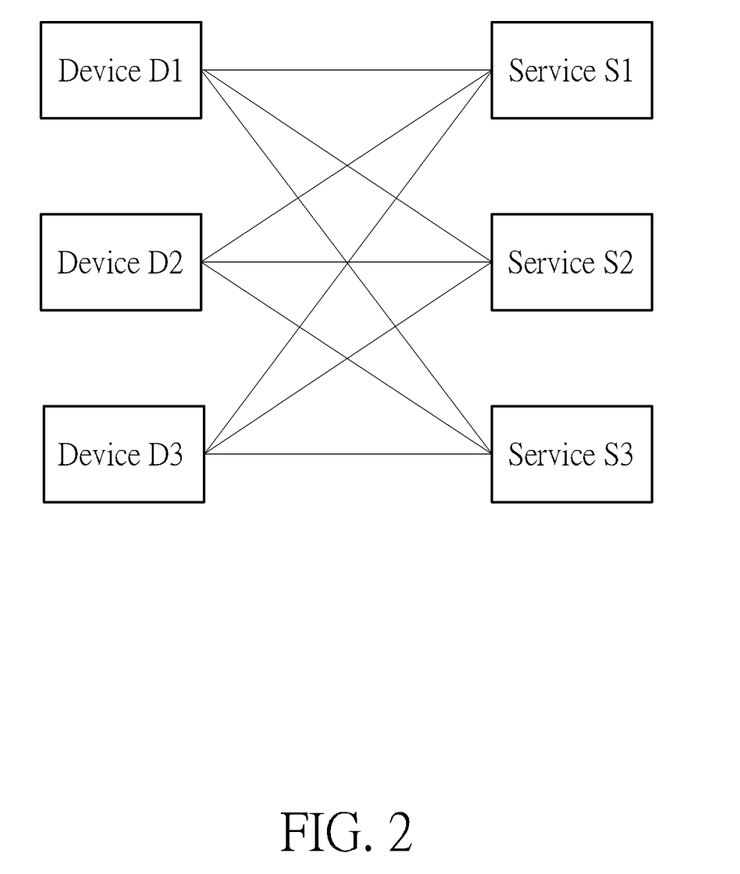
FIG. 2 is an illustration of different configurations corresponding to different devices and different services of the social collaboration system in FIG. 1.

FIG. 2 is an illustration of different configurations corresponding to different devices D1 to D3 and different services S1 to S3 of the social collaboration system 100. In the social collaboration system 100, a virtual person selected from the plurality of virtual persons in the social platform of the server 14 can correspond to a service virtual person, an information virtual person, a configuration virtual person, or a device virtual person. For simplicity, a method for generating the configuration virtual person is described below. In FIG. 2, a device D1 to a device D3 can be different devices, or same devices with different enabling functions. For example, the device D1 can be a camera with an infrared function. The device D2 can be a camera with a night vision function. The device D3 can be a conventional camera. The service S1 to the service S3 can be different services. For example, the service S1 can be configured as a "daytime image recognition service" by the user. The service S2 can be configured as a "nighttime image recognition service" by the user. When the camera with the night vision function (device D2) is bound to the service S1 for performing daytime image recognition, the night vision function of the device D2 is inactive. The device D2 and the service S1 can be bound to a virtual configuration robot. In another example, when the camera with the night vision function (device D2) is bound to the service S2 for performing nighttime image recognition, the night vision function of the device D2 is activated. The device D2 and the service S2 can be bound to a virtual configuration robot. In other words, different virtual configuration robots can be generated by binding different services to a device. Similarly, different virtual configuration robots can be generated by binding different devices to a service. Thus, in FIG. 2, three devices and three services can produce nine different virtual configuration robots. Particularly, "virtual configuration robot" can be regarded as "virtual configuration person" since they can use artificial intelligence for responding message. However, the present invention is not limited to interacting between devices to services for generating virtual configuration persons. For example, the device D1 to the device D3 can be replaced with three identities corresponding to different real persons. In other words, a configuration virtual person can be generated by binding a service or information to a device or a person. The configuration virtual person can be generated by binding a service to another service. The configuration virtual person can be generated by binding a resource group to another resource group. Any reasonable resource combination or modification falls into the scope of the present invention. In the embodiment, the device virtual persons are generated by binding the devices D1 to D3 to virtual persons after the devices D1 to D3 are registered and identified. In other words, after the devices D1 to D3 are registered and identified, the server 14 can verify validity of the devices D1 to D3 and proceed with their binding processes of the virtual persons.

Figure 3:
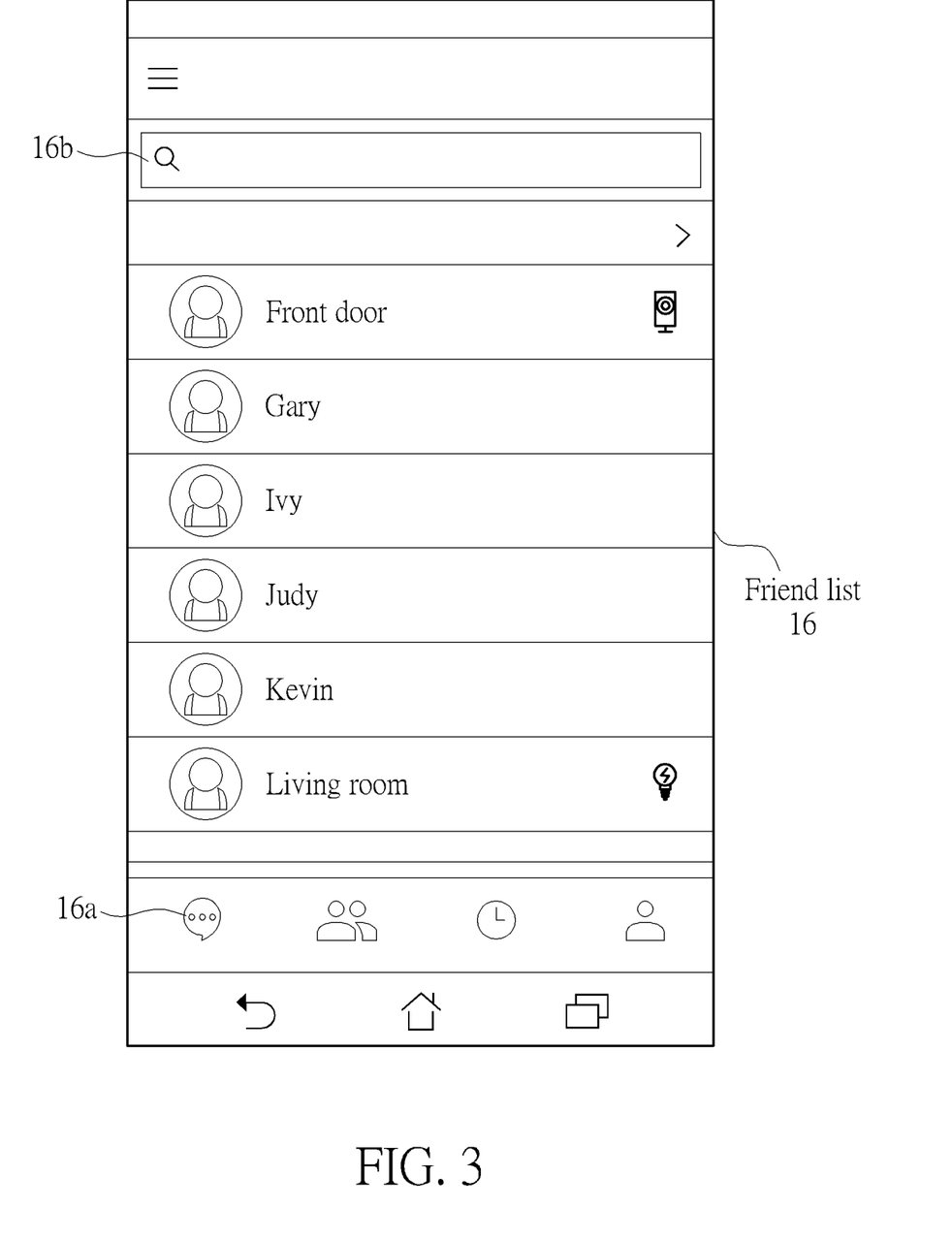
FIG. 3 is an illustration of a friend list displayed in a user device of the social collaboration system in FIG. 1.

FIG. 3 is an illustration of a friend list 16 displayed in a user device 15 of the social collaboration system 100. As previously mentioned, the social platform of the social collaboration system 100 includes virtual persons and real persons. Thus, the friend list 16 of a user can include some virtual persons and some real persons. For example, as shown in FIG. 3, the friend list 16 includes six friends. Nicknames of the real persons are denoted as "Gary", "Ivy", "Judy" and "Kevin". Nicknames of the virtual persons are denoted as "Front door" and "Living room". In the friend list 16, a virtual person "Front door" corresponds to a configuration of a camera disposed on a front door. A virtual person "Living room" corresponds to a configuration of a lighting device disposed in a living room. The friend list 16 can further include chat key 16a. The user can press the chat key 16a for chatting with at least one designated virtual person or real person. The friend list 16 can include a search window 16b for searching a specific friend or a specific device. The user can acquire a search result by entering a specific friend name or a specific device name.

Figure 4:
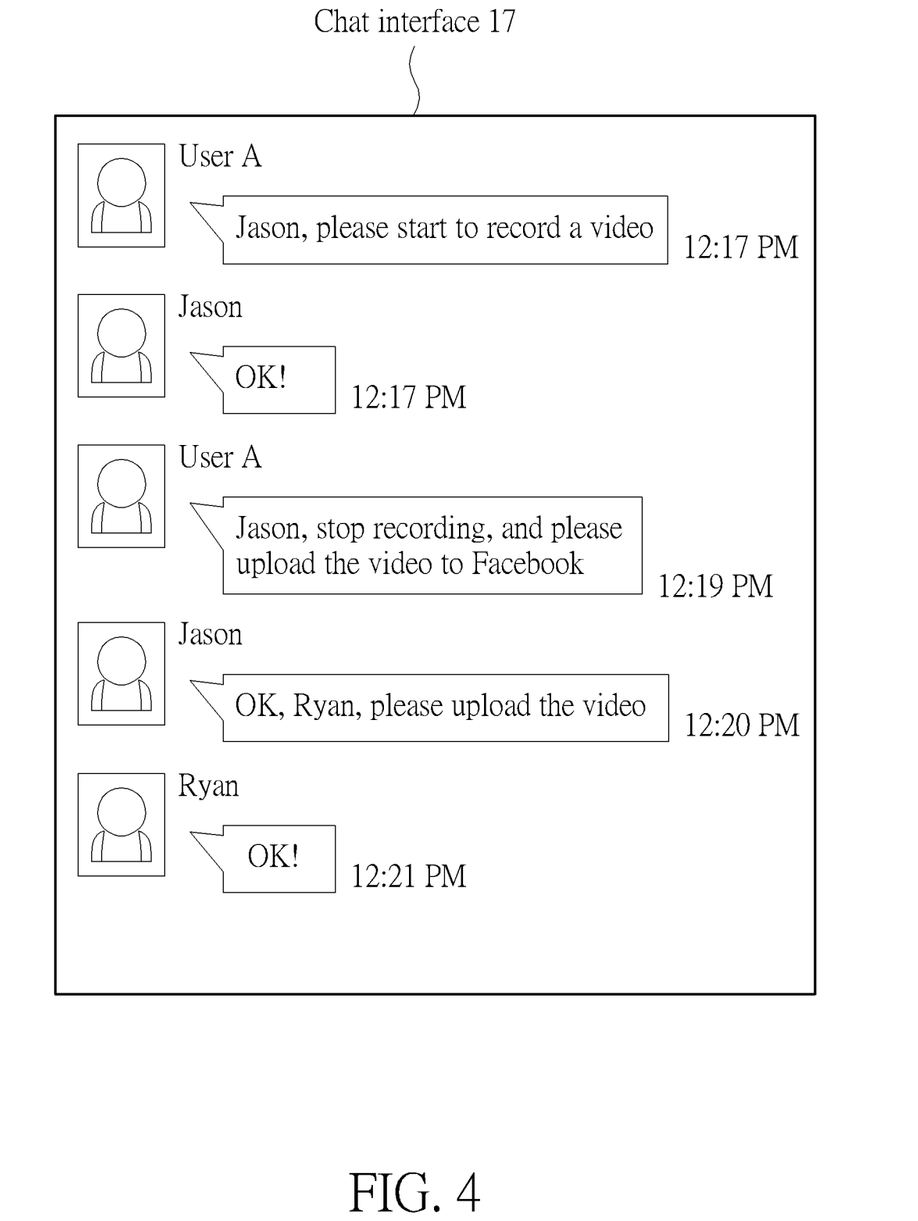
FIG. 4 is an illustration of a chat interface displayed in the user device of the social collaboration system in FIG. 1.

FIG. 4 is an illustration of a chat interface 17 displayed in the user device 15 of the social collaboration system 100. As previously mentioned, the social collaboration system 100 has social collaboration capability. In other words, virtual persons in the chat interface 17 can perform human-like communications and interaction functions. For simplicity, in FIG. 4, the nickname of a real person is denoted as user A. The nickname of a virtual person corresponding to video recording configuration is denoted as Jason. The nickname of a virtual person corresponding to Facebook uploading configuration is denoted as Ryan. Specifically, a chat mode of the social collaboration system 100 is a group chat mode. In other words, chat history and chat data in the chat interface 17 are received by all friends (including virtual persons and real persons) in the chat interface 17. For example, the user A (i.e., real person) enters a message "Jason, please start to record a video" to the chat interface 17. Then, the virtual person "Jason" corresponding to video recording configuration can send a response message, such as "OK". Then, the virtual person "Jason" performs a video recording function. After a while, the user A enters a message "Jason, stop recording, and please upload the video to Facebook". Then, the virtual person "Jason" corresponding to video recording configuration can send a response message, such as "OK, Ryan, please upload the video". Then, the virtual person "Ryan" corresponding to Facebook uploading configuration is triggered. The virtual person "Ryan" can send a response message "OK!" to the virtual person "Jason". Then, the virtual person "Ryan" performs a video uploading function. However, interaction of friends in the chat interface 17 is not limited to FIG. 4. For example, the virtual person "Jason" can make friend with the virtual person "Ryan" and a time virtual person. Thus, the user A can enter a message of video recording request associated with a specific time condition for triggering functions of the virtual person "Jason" and the time virtual person. In other words, when the chat interface 17 only includes the virtual person "Jason" corresponding to video recording configuration, the virtual person "Jason" is only triggered by an action of "video record". When the chat interface 17 includes the virtual person "Jason" corresponding to video recording configuration, the virtual person "Ryan" corresponding to Facebook uploading configuration, and the time virtual person corresponding to time configuration, the virtual person "Jason" can be triggered by additional conditions, such as triggered by the time condition and triggered by the Facebook uploading action. Similarly, the time virtual person can also be used for uploading the video to Facebook at a specific time since its friend "Ryan" can provide an agreement to upload the video to Facebook. Broadly speaking, in the chat interface 17, when N virtual persons are correlative, since they have communication capabilities and collaboration capabilities, each virtual person has its own configuration and additional (N−1) configurations. N is a positive integer greater than two. Therefore, by introducing additional virtual persons in the chat interface 17, the social collaboration system 100 can provide an accurate response to the user. By doing so, operation flexibility and configuration utilization can be increased.

As previously mentioned, the server 14 has the software program for providing the social platform. The software program can be used for driving the service agent generator or executing functions of agent services. In the social collaboration system 100, the service agent generator can automatically generate a recommended friend group and optimal configuration combinations to the user. First, the user inputs a message to the user device 15. Here, the message can be defined as any image message, any barcode message, any sound message, any word message, or text message. The message can be transmitted to the server 14 through the user device 15 and analyzed by the server 14. For example, when the message inputted by the user is the text message, the server 14 can receive the text message and generate a plurality of keywords according to the text message. For example, the server 14 can generate a plurality of index terms of the text message. In another example, when the server 14 receives a paragraph message, the paragraph message can be analyzed. Then, the server 14 can generate the plurality of index terms corresponding to a specific place, a specific time, a specific behavior, or a specific person's name according to the paragraph message. Specifically, chat history and chat data can be received by all identities of the social platform of the server 14. Thus, the server 14 can select at least one friend of the social platform for generating a message friend group according to the plurality of keywords. For example, after the message is inputted to the server 14, all identities of the social platform of the server 14 can receive the message. Then, each identity of the social platform can transmit a correlation status to the service agent generator according to the plurality of keywords of the message. For example, the message can include "having lunch before 1 pm in the Italian restaurant". Keywords of the message can be "before 1 pm" with respect to a time condition, and "Italian restaurant" with respect to a place condition. If a virtual person (i.e., a restaurant reservation system) is relevant to the time condition, the virtual person can transmit a correlation message to the service agent generator. Similarly, if a virtual person (i.e., a map system) is relevant to the place condition, the virtual person can transmit a correlation message to the service agent generator. Virtual persons can also transmit notified messages to the server 14 if they are irrelevant to the message. Further, the server 14 can calculate a correlation status of each real person according to the chat history or data statistics. Briefly, the service agent generator of the server 14 can perform an automatic matching process from all identities (i.e., including virtual persons and real persons) for facilitating social collaboration in order to process inputted message. Then, the service agent generator can automatically select or recommend at least one friend with high relevance to the message according to the correlation status of each identity of the social platform for generating the message friend group. As previously mentioned, the message friend group can include the plurality of virtual persons and the plurality of real persons. Additionally, the message friend group can be regarded as a chat group. Any communication message or information posted in the message friend group can be received by all members (friends) of the message friend group.

In the social collaboration system 100, the message friend group can be automatically generated or manually selected from the social platform for facilitating social collaboration in order to process inputted message. However, the user can add at least one friend with respect to the message in the friend list 16 to the message friend group. The service agent generator can select at least one agent (i.e. identity) with respect to the message exclusive of the friend list 16 for generating the message friend group. Since the social platform of the server 14 belongs to a world social platform for all things, recommended friends of the service agent generator according to the message can be regarded as a plurality of resource points selected from all resources in the world for optimally facilitating social collaboration. Further, when a certain virtual person (i.e., a service, a device, or a configuration) is changed or disabled (i.e., because of resource variations), the service agent generator can search at least one additional friend through the social platform or a social network for extending the message friend group. Further, in the social collaboration system 100, each friend of the message friend group has a user-defined or a default privacy authority and/or data sharing authority, regardless of the message friend group recommend by the system or the message friend group selected by the user manually. For example, a friend of the message friend group is a camera lens of a freeway. Thus, its authority is inherently configured to a "public state". For example, a friend of the message friend group is a virtual person corresponding to a private device of a user. The user can adjust its privacy authority.

After the message friend group is generated in order to process the message by using the social collaboration, each friend can generate (or say, set) a function status according to the plurality of keywords. Illustrations are depicted as below. In the social collaboration system 100, the function status of the each friend of the message friend group includes a triggering status and/or an action status. For example, a message of "having dinner at 6 pm" can be decomposed into keywords "having dinner" and keywords "6 pm". A virtual person of a restaurant reservation system can define its triggering status as "6 pm" and define its action status as "having dinner". As previously mentioned, all friends of the message friend group can perform collaboration interaction together. Thus, an "action status" of a certain friend can trigger another friend. For simplicity, communications of three friends are introduced below. A first friend defines its triggering status as "6 pm" and defines its action status as "reserving dinner". A second friend defines its triggering status as "reserving dinner" and defines its action status as "notifying a short message service to the user device". A third friend defines its triggering status as "notifying the short message service to the user device" and defines its action status as "sending a message to Facebook friends". Thus, the message friend group can perform social collaboration according to a message of "having dinner at 6 pm" for generating a message rule as "requiring a reservation before 6 pm, executing a short message service notification after the reservation is completed, and sending a message to Facebook friends". In other words, the first friend can generate a first triggering status and a first action status according to the plurality of keywords. The second friend can generate a second triggering status and a second action status according to the first action status. The third friend generates a third triggering status and a third action status according to the second action status. Finally, the service agent generator can generate the message rule according to the first action status, the second action status, and the third action status. Further, the service agent generator can generate a virtual configuration friend corresponding to the message rule according to the function status of the each friend and keywords of the message. Here, the virtual configuration friend belongs to a virtual person with respect to a specific message rule generated by the service agent generator. Thus, a life time of the virtual configuration friend has to satisfy some time conditions according to the keywords. Once the life time elapses, the virtual configuration friend is disabled. A disabled virtual configuration friend can be presented as an icon with gray color. For example, the virtual configuration friend corresponds to the message rule of "requiring a reservation before 6 pm, executing a short message service notification after the reservation is completed, and sending a message to Facebook friends". The virtual configuration friend can generate a response message corresponding to the message rule. The response message can be displayed on the chat interface. In the embodiment, a life time of the virtual configuration friend is a time duration from current time to 6 pm. In other words, the virtual configuration friend is disabled after 6 pm. If the user desires to modify a service of reservation, a service of short message service notification, or a service of sending the message to Facebook friends, the user can directly make some configuration amendments through the virtual configuration friend. When the virtual configuration friend is disabled (i.e., an icon becomes gray color), the virtual configuration friend can be deleted by the user.

Figure 5:
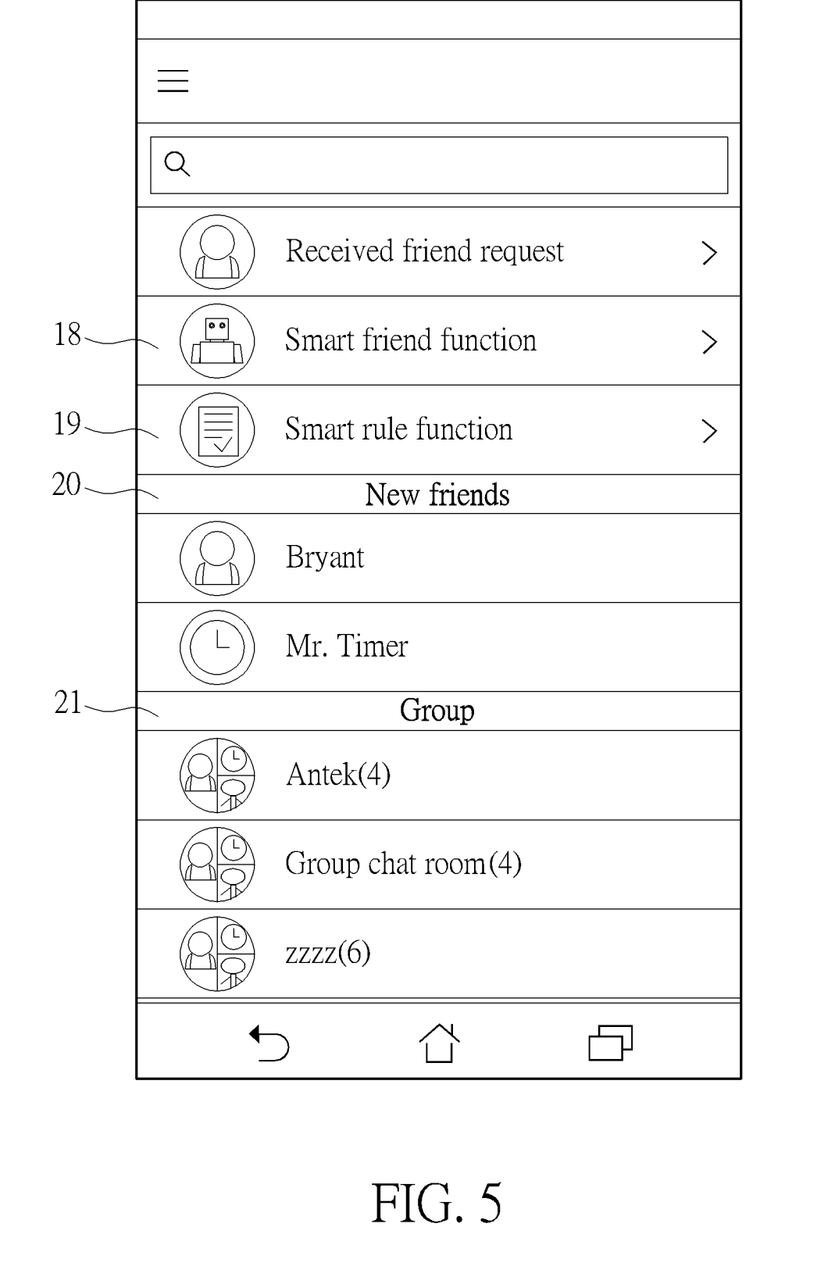
FIG. 5 is an illustration of a smart friend function icon, a smart rule function icon, a new friend interface, and a group name interface.

FIG. 5 is an illustration of a smart friend function icon 18, a smart rule function icon 19, a new friend interface 20, and a group name interface 21. In the embodiment, the user device 15 can be a smart phone including a display for displaying the social platform. As shown in FIG. 5, the display of the user device 15 can display the smart friend function icon 18, the smart rule function icon 19, the new friend interface 20, and the group name interface 21. When the user clicks the smart friend function icon 18, the service agent generator can generate a recommended message friend group or message friend list previously mentioned. When the user clicks the smart rule function icon 19, the user can make some amendments of the message rule by using an interface. The new friend interface 20 displays some new friends recently added, such as some new virtual persons and/or some new real persons. The group name interface 21 can display group name currently generated. The group name corresponds to a friend group recommended by the system or manually selected by the user.

Figure 6:
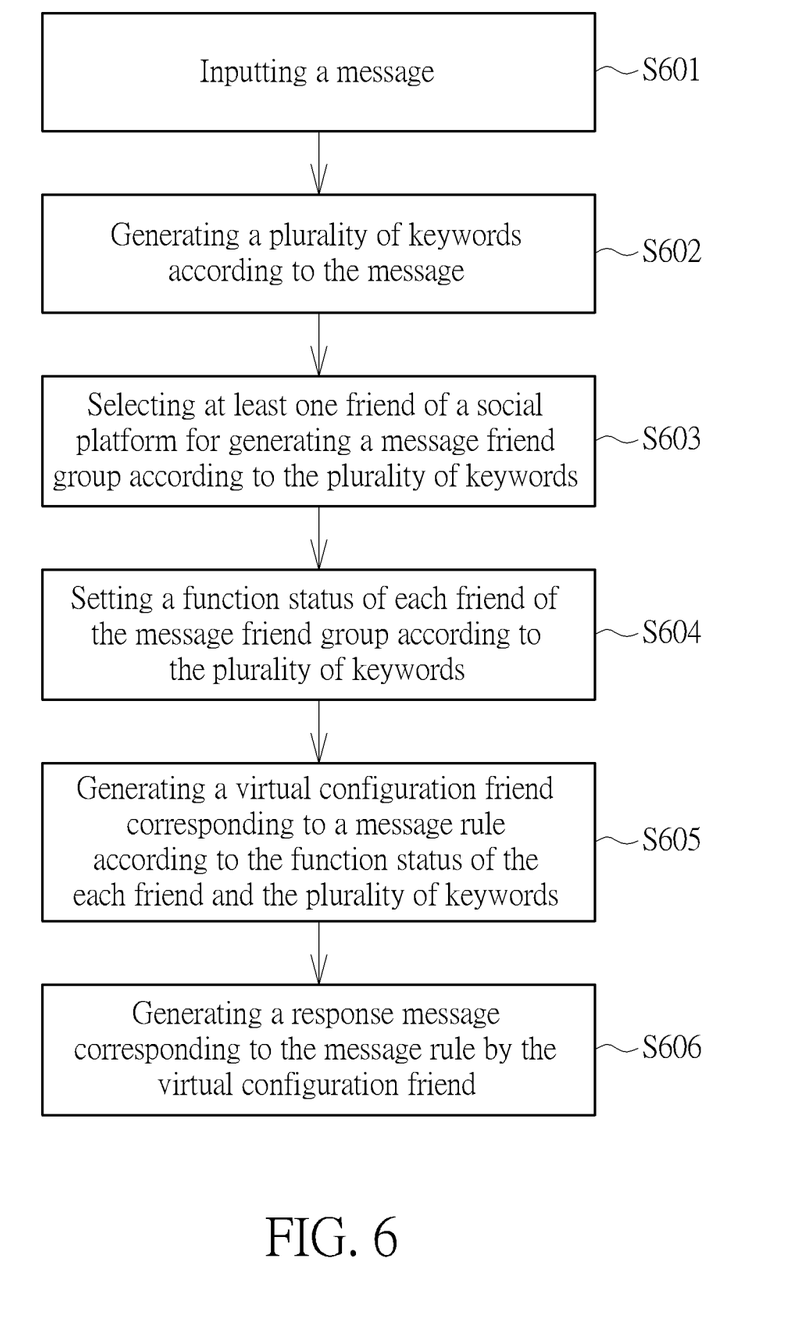
FIG. 6 is a flow chart of a social collaboration method for all things by using the social collaboration system in FIG. 1.

FIG. 6 is a flow chart of a social collaboration method for all things by using the social collaboration system 100. The social collaboration method includes step S601 to step S606. Any reasonable step modification falls into the scope of the present invention. Step S601 to step S606 are illustrated below.

Step S601: inputting a message;
Step S602: generating a plurality of keywords according to the message;
Step S603: selecting at least one friend of a social platform for generating a message friend group according to the plurality of keywords;
Step S604: setting a function status of each friend of the message friend group according to the plurality of keywords;
Step S605: generating a virtual configuration friend corresponding to a message rule according to the function status of the each friend and the plurality of keywords;
Step S606: generating a response message corresponding to the message rule by the virtual configuration friend.

Step S601 to step S606 are illustrated previously. Thus, their illustrations are omitted here. By doing so, the social collaboration system 100 can integrate and search an appropriate resource group according to the message inputted by the user. The resource group corresponds to several real persons and/or virtual persons. The real persons and the virtual persons can perform social collaboration for generating a message rule and a corresponding virtual configuration friend. For the user, a response message can be acquired by communicating with the virtual configuration friend. Further, the message rule can be amended through the virtual configuration friend. In the social collaboration system 100, several virtual configuration friends can be generated according to input/output (I/O) connections between an identified hardware layer and software layer. The service agent generator can generate all possible configuration combinations. Further, the service agent generator can provide an optimal virtual configuration friend to the user according to integrity of the I/O connections and inputted message to the user.

To sum up, the present invention discloses a social collaboration method and system for all things. Since the social platform of the present invention belongs to a world social platform for all things, recommended friends provided by the service agent generator according to the message can be regarded as a plurality of resource points selected from all resources in the world for optimally facilitating social collaboration. Additionally, the message friend group can be regarded as a chat group. Any communication message or information posted in the message friend group can be received by all members (friends) of the message friend group. Since the service agent generator can generate the message rule and the corresponding virtual configuration friend to a user, the social collaboration system can be used for many applications. For example, a message rule defined by the user can be applied to a user's social circle or lifestyle. The message rule defined by the user can be shared with other users. Also, the message rule can be applied to medical prescriptions in order to provide recommended treatment options for health care or rehabilitation. The message rule can be applied to regular checks such as electronic fetters or police patrol routes. Thus, the social collaboration method of the present invention can provide intelligent message responses and configurations by making full use of various resource points. Further, the user can directly make some configuration amendments through the virtual configuration friend. Therefore, the social collaboration method of the present invention can provide high operation efficiency in conjunction with high operation convenience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A social collaboration method for all things comprising:
inputting a message;
generating a plurality of keywords according to the message;
generating a correlation message of a first identity of a social platform when the first identity is relevant to the message;

generating a notified message of a second identity of the social platform when the second identity is irrelevant to the message;
generating a correlation status according to the correlation message or the notified message of each identity of the social platform;
transmitting the correlation status of the each identity of the social platform to a service agent generator;
performing an automatic matching process for all identities of the social platform by the service agent generator for responding to the message;
selecting a plurality of friends with high relevance to the message according to the correlation status of the each identity of the social platform for generating a message friend group comprising a first friend, a second friend, and a third friend according to the plurality of keywords;
setting a function status of each friend of the message friend group according to the plurality of keywords;
generating a first triggering status and a first action status by the first friend according to the plurality of keywords;
generating a second triggering status and a second action status by the second friend according to the first action status;
generating a third triggering status and a third action status by the third friend according to the second action status;
generating a message rule according to the first action status, the second action status, and the third action status;
generating a virtual configuration friend corresponding to the message rule according to the function status of the each friend and the plurality of keywords; and
generating a response message corresponding to the message rule by the virtual configuration friend;
wherein at least one of the first friend, the second friend, and the third friend is a virtual person, a plurality of virtual persons are added to the message friend group for assisting the virtual configuration friend, the plurality of virtual persons comprises a configuration virtual person and a device virtual person, the configuration virtual person is generated by binding different services to a device, and the device virtual person is generated by binding different devices to another virtual person; and
wherein the message, chat data of processing interactive cooperation of all friends in the message friend group, and chat history data are received by all friends of the message friend group, and the plurality of virtual persons in the message friend group are used for collaboratively collecting resources corresponding to the message rule after the message, the chat data, and the chat history data are received by the plurality of virtual persons.

2. The method of claim 1, wherein the function status of the each friend of the message friend group comprises a triggering status and an action status.

3. The method of claim 1, wherein the message is a text message, and the plurality of keywords is a plurality of index terms of the text message.

4. The method of claim 1, wherein selecting the plurality of friends with high relevance to the message according to the correlation status of the each identity of the social platform for generating the message friend group is selecting the plurality of friends with high relevance to the message in a friend list of the social platform, or selecting a plurality of agents with high relevance to the message exclusive of the friend list for generating the message friend group.

5. The method of claim 1, wherein the social platform comprises a plurality of real persons and the plurality of virtual persons.

6. The method of claim 1, wherein the first friend communicates with the second friend for collaboratively generating the response message corresponding to the message rule.

7. The method of claim 1, further comprising:
providing a recommended friend group to a user by a service agent generator according to the plurality of keywords; and
updating the message friend group by the user optionally according to the recommended friend group.

8. The method of claim 7, further comprising:
searching at least one additional friend through the social platform or a social network by the service agent generator for extending the message friend group.

9. The method of claim 1, wherein the message friend group comprises N virtual persons with respect to the message, the N virtual persons have communication capabilities and collaboration capabilities, each virtual person has its own configuration and additional (N-1) configurations, and N is a positive integer greater than two.

10. The method of claim 9, wherein the N virtual persons have capabilities for making friends on-line and establishing friend groups on-line.

11. The method of claim 1, further comprising:
receiving the message by all identities of the social platform after the message is inputted to the social platform;
wherein selecting the plurality of friends with high relevance to the message according to the correlation status of the each identity of the social platform for generating the message friend group according to the plurality of keywords is the service agent generator automatically selecting or recommending the plurality of friends with high relevance to the message according to the correlation status of the each identity of the social platform for generating the message friend group.

12. The method of claim 1, wherein the each friend of the message friend group has a user-defined privacy authority, a default privacy authority or a data sharing authority.

* * * * *